United States Patent [19]

Cody et al.

[11] 3,791,743

[45] Feb. 12, 1974

[54] PORTABLE FLAME PHOTOMETER AND SAMPLING PROBE

[75] Inventors: Thomas E. Cody, Allentown, Pa.; Arthur L. Davison, Saugus, Calif.; Joseph A. Grohowski, Bethlehem; Geza J. Horvath, both of Bethlehem, Pa.; Theodore R. Linde, Coopersburg, Pa.

[73] Assignee: Bethlehem Steel Corporation, Bethlehem, Pa.

[22] Filed: Mar. 21, 1973

[21] Appl. No.: 343,305

[52] U.S. Cl. .................... 356/187, 356/36, 356/81, 356/86, 356/87
[51] Int. Cl. ..... G01n 21/58, G01n 1/00, G01j 3/30
[58] Field of Search ............ 356/36, 81, 85, 87, 187

[56] References Cited
UNITED STATES PATENTS

| | | | |
|---|---|---|---|
| 3,602,595 | 8/1971 | Dahlquist et al. | 356/86 |
| 3,396,303 | 8/1968 | Gordon | 356/86 |
| 2,857,801 | 10/1958 | Murry | 356/187 |
| 3,102,921 | 9/1963 | Peras | 356/81 |

*Primary Examiner*—Ronald L. Wibert
*Assistant Examiner*—V. P. McGraw

[57] ABSTRACT

A hand-held sampling probe remotely connected to a portable flame photometer enables immediate on-site identification of a desired piece of steel in a mixed stockpile thereof according to a percentage concentration of manganese element in the steel. An operator causes the sampling probe to strike a low-voltage electric arc on a sampling surface of the test piece so as to generate an aerosol of atmospheric air and sample particles. An induction burner located in the flame photometer is fueled by a self-contained propane bottle and is adjusted to aspirate the aerosol and excite the sample particles in low-energy flame. Photoelectric circuits analyze the flame spectra and accumulate concentrations of iron as an internal standard and manganese as the identifying element. When the iron concentration reaches a predetermined value, a control unit interrupts the electric arc and element accumulations and displays percent manganese concentration on a meter without ratioing iron and manganese signals.

15 Claims, 5 Drawing Figures

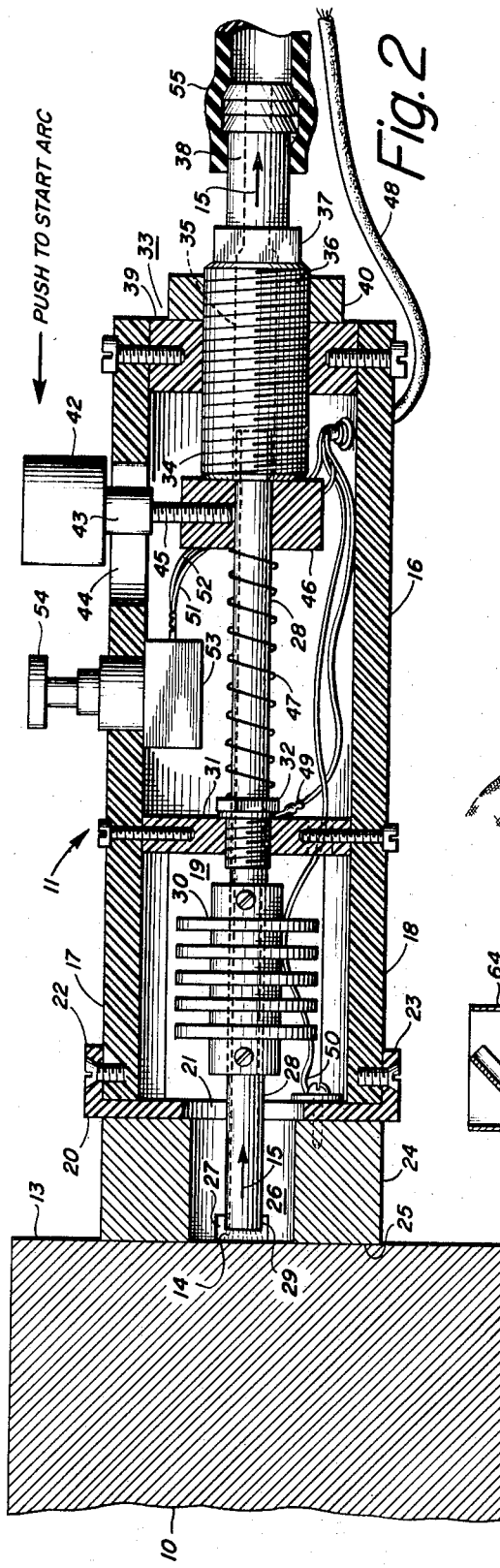
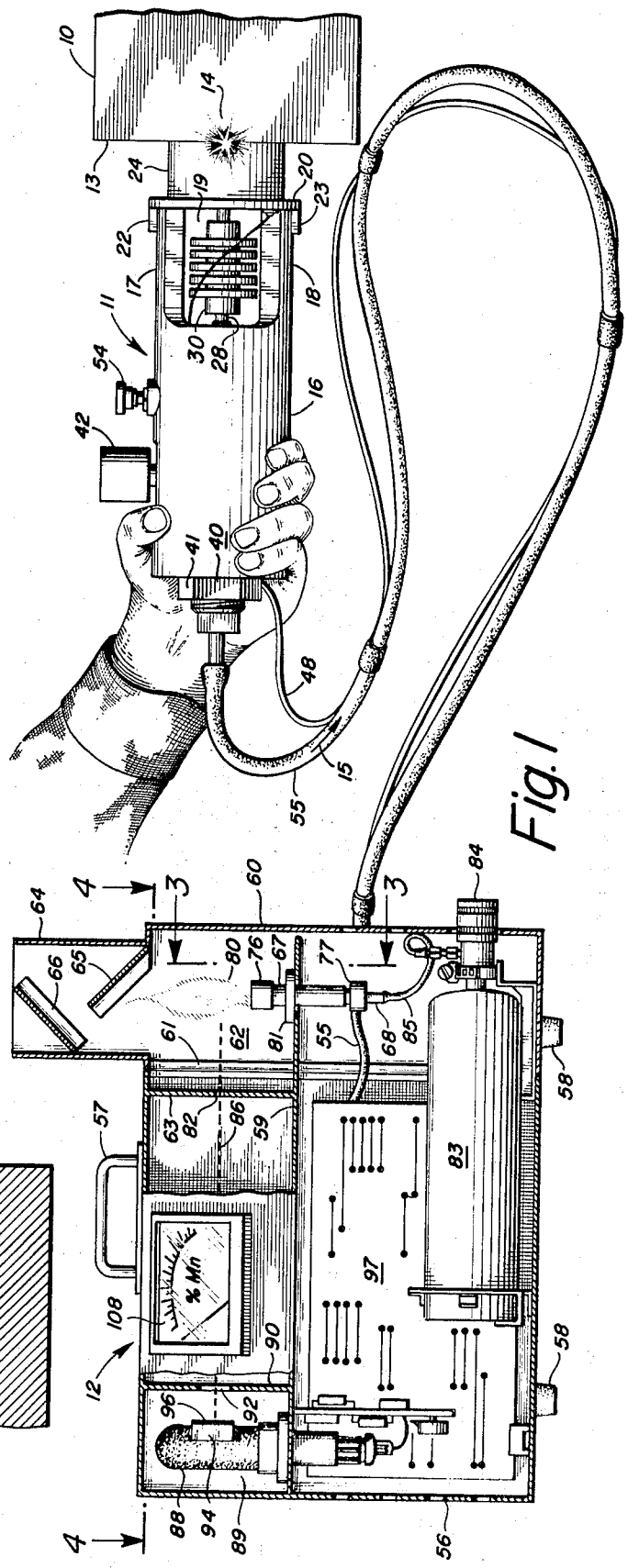

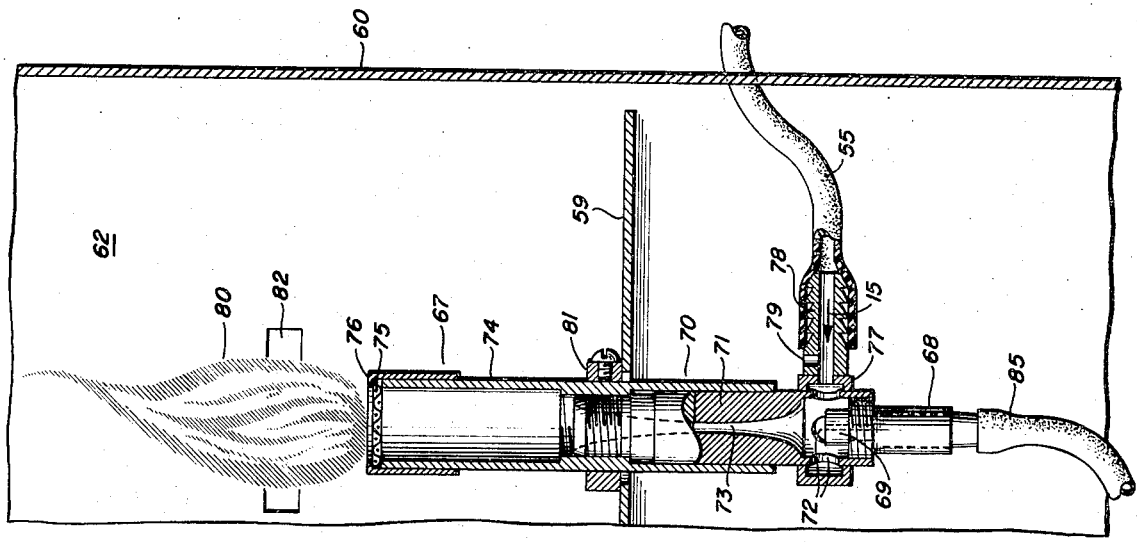

PORTABLE FLAME PHOTOMETER AND SAMPLING PROBE

BACKGROUND OF THE INVENTION

1. Field of the Invention

This invention relates broadly to spectrometric apparatus. More particularly, the invention concerns portable spectrometric apparatus capable of being hand-carried by an operator to a test site for immediately identifying a particular type of test piece in a mixed stockpile of piece materials such as steel or other electrically conductive materials.

2. Description of the Prior Art

In the primary steel industry, as well as many steel-user and other metal industries, there has been a long standing problem of providing a rapid and reliable on-site method of identifying mixed steels and other metals, and to use unskilled personnel in the identifying procedure. That is, identifying the grade, or at least two elements of composition, of unmarked steel or other metal bars, billets, plates and the like in a mixed stockpile thereof located almost anywhere, and to use personnel having little testing skills.

Heretofore, one common on-site method of identifying mixed steels, for example, involved the well-known spark test. In this test, a highly skilled operator carefully applies a high speed grinder to a test piece while visually analyzing the character of the resulting spark pattern. Identification is based upon determining the amount of carbon in the test piece which produces a known characteristic spark pattern, and to the amount of a limited number of additional elements consisting of molybdenum, nickel, silicon and/or tungsten which vary the spark patterns. Test accuracy and reliability vary widely because of the different skills of different operators and variations in test environmental conditions.

Another method of identifying mixed steels is the well known spectrochemical analysis procedure. Here a sample is physically removed from a steel test piece at a site somewhere in a plant facility, identified and transported to a remotely located laboratory, and prepared and analyzed on a spectrometer by a skilled operator. This method normally provides an accurate and complete analysis of complex samples, whereas identification of the test piece usually may be made on the basis of iron and only one other element. However, the spectrometer while accurate is immobile, is costly in terms of capital equipment, operation, maintenance, and has inherent delays in identifying a test piece at the plant site.

Some improvement in the spectrochemical analysis method is shown in U.S. Pat. No. 3,602,595 to Dahlquist et al. This patent teaches a method and apparatus for generating a sample aerosol by high voltage electric arc in a typical sampling chamber which has been remotely located a limited distance away from the remaining portions of an otherwise conventional laboratory spectrometer and sealably affixed to a prepared surface of a test piece. The electric arc disrupts sample particles from the surface of the test piece after pre-sparking said surface. A pressurized source of argon is required as both an inert arc-supporting gas in the sampling chamber and as an inert carrier gas in the aerosol for transporting the sample particles to the spectrometer for analysis. Dahlquist et al. have the advantage of providing limited on-site sampling, and therefore minimize sample transport time, but have all the other attendant disadvantages in identifying a test piece as noted above for the laboratory spectrochemical analysis method.

SUMMARY OF THE INVENTION

One of the objects of this invention is to provide improved spectrometric apparatus that substantially overcomes the prior art disadvantages.

Another of the objects of this invention is to provide portable spectrometric apparatus capable of being hand-carried to a test site and immediately identify a particular type of test piece in a mixed stockpile of piece materials.

Another object of this invention is to provide low cost portable spectrometric apparatus requiring little or no sample surface preparation, having a minimal number of components, being easy to operate and maintain by unskilled personnel, yet enable rapid and reliable identification of mixed materials on a site located almost anywhere.

The foregoing objects are obtained with portable spectrometric apparatus consisting essentially of a hand-held sampling probe remotely connected to a hand-carried portable flame photometer which, in the case of identifying mixed steels, is adapted to analyze the test piece for iron (Fe) as an internal standard and manganese (Mn) as an identifying element. This is because these elements are always present in steel compositions but were unable to be recognized in the prior art by the spark testing procedure noted above. In the present apparatus, an unskilled operator causes the sampling probe to strike a low-voltage electric arc on a sampling surface of the test piece so as to generate an aerosol of atmospheric air and sample particles. An induction burner located in the flame photometer is fueled by a self-contained propane bottle and is adjusted to aspirate the aerosol and excite the sample particles in a low-energy flame. Photoelectric circuits analyze the flame spectra and accumulate concentrations of iron and manganese and when the iron concentration reaches a predetermined value, a control unit interrupts both the electric arc and element accumulations and displays percent manganese concentration on a meter without ratioing iron and manganese signals to identify a particular test piece.

BRIEF DESCRIPTION OF THE DRAWINGS

FIG. 1 is an illustration of the portable spectrometric apparatus of the present invention showing the hand-held sampling probe attached to a billet test piece and connected by way of a flexible hose and electric cable to the portable flame photometer, the latter being shown mostly in vertical cross-section.

FIG. 2 is a longitudinal cross-section of the sampling probe used in the present invention.

FIG. 3 is a vertical cross-section of an induction burner used in the portable flame photometer used in the present invention.

FIG. 4 is a horizontal cross-section of the upper portion of the flame photometer showing the location of electro-optical components in relation to the flame of the induction burner.

FIG. 5 is a schematic diagram of the present invention including the measuring and control circuits involved in the spectrometric analysis of a test piece.

DESCRIPTION OF THE PREFERRED EMBODIMENT

Referring to the drawings, particularly FIG. 1, the portable spectrometric apparatus of the present invention is capable of identifying test piece 10 as a steel billet having a desired percent manganese (Mn) concentration when among a mixed stockpile of billets having various percentages of manganese concentrations and the stockpile is located on a site almost anywhere, it being understood that all desired billets have a predetermined percent iron (Fe) concentration as an internal standard element. The portable spectrometric apparatus consists essentially of combining hand-held sampling probe 11 by way of remote connections to hand-carried portable flame photometer 12. This combination of apparatus is adapted to permit one unskilled operator to rapidly and reliably identify billet 10 while carrying said apparatus at or around test site.

Hand-held sampling probe 11 is detailed in FIG. 2 and is adapted to be brought into contact with test-piece sampling surface 13, and further adapted to strike a low-voltage electric arc 14 on a sampling surface 13 in atmospheric air when powered from an external source. The arcing causes generation of sample aerosol 15 which consists of atmospheric air as a carrier and sample particles disrupted from sampling surface 13 by the electric arc. Aerosol generation is accomplished without grinding, pre-sparking or otherwise preparing sampling surface 13 as is done in the aforementioned prior art apparatus.

Sampling probe 11 includes hand-held probe housing 16 which is a hollow cylinder made of electrically insulating material such as commercially available "synthane". Probe housing 16 is provided with support legs 17 and 18 at one end thereof and an atmospheric air space 19 between said legs. A circular brass support plate 20 having central opening 21 is formed with flanges 22 and 23 adapted to be screw-attached to legs 17 and 18.

Sampling probe 11 also includes annular electrode 24 which is connected mechanically and electrically to brass support base 20 and functions as the probe's base. Annular electrode 24 is fabricated having a relatively smooth contact surface 25, axial cylindrical opening 26 and lateral channel opening 27 across contact surface 25, both said openings enabling passage of atmospheric air therethrough. Contact surface 25 is adapted to be detachably mountable on sampling surface 13 in such manner as to provide a good electrical contact therewith. When billet 10 is made of steel, a commercially available alnico permanent magnet having the prerequisite configuration is a preferred structure for annular electrode 24, otherwise, almost any hard electrically conducting material may be used.

The alnico magnet has the advantages of providing a detachably mountable contact structure having sufficient pulling forces through contact surface 25 and sampling surface 13 to maintain substantially uniform electrical conductivity between electrode 24 and billet 10 during testing, as well as to hold the base of sampling probe 11 at the same sampling site throughout a test, both without requiring seals or other mechanical means coacting between probe 11 and billet 10 as in the prior art. This arrangement is a factor which enables hand-held sampling probe 11 to generate sample aerosol 15 under uniform sampling conditions in an atmospheric air environment, thereby contributing to the reliable operation of the portable spectrometric apparatus of the present invention.

Inasmuch as annular electrode 24 is designed to contact sampling surface 13, it is intended that sampling surface 13 function as a cathodic source when electrode 24 is connected to a negative source of direct current as will be mentioned below. For this reason, annular electrode 24 will hereinafter be referred to as annular cathode 24, even though it is not intended to be a cathodic source in the usual sense.

Also included in sampling probe 11 is movable hollow electrode 28 which is adapted to be connected externally not only to a positive source of direct current for cooperating with cathode 24 in the production of electric arc 14, but also to portable flame photometer 12 for transporting sample aerosol 15 away from the billet sampling surface 13 where the aerosol is generated. Therefore, electrode 28 will hereinafter be referred to as movable hollow anode 28. Anode 28 is a hollow metal tube of copper, for example, which is slidably supported coaxially within probe housing 16 by electrically insulated front and rear support assemblies as shown in FIG. 2 and described below. Hollow anode 28 is provided with anode tip 29 having an end cut parallel to the annular cathode contact surface 25 and insulated from cathode 24 only by atmospheric air in axial opening 26. This enables a ring-shaped electric arc 14 to be struck in atmospheric air between anode tip 29 and billet sampling surface 13. Sample particles are disrupted from surface 13 by arc 14 and mixed with atmospheric air to form sample aerosol 15, the latter flowing away from sampling surface 13 through the interior of hollow anode 28.

Heat generated by electric arc 14 may be dissipated from anode tip 29 by securing finned aluminum heat sink 30 to anode 28, near tip 29 and in atmospheric air space 19 of probe housing 16. This will improve the sampling probe 11 duty cycle and increase the rapidity with which aerosol samples 15 may be made.

The front support for tubular anode 28 is provided by support member 31 which is made of nylon, for example, and screw-attached to probe body 16 near the beginning of legs 17 and 18. A threaded, shouldered, brass bushing 32 is located centrally through support member 31 and bored suitably for guiding anode 28 movement axially while providing a sliding electrical contact from anode 28 to external wiring.

The rear support for tubular anode 28 consists of rear support assembly 33 which may also be made of nylon. Rear support assembly 33 includes gap adjusting screw 34 having an axial bore 35 therethrough. Axial bore 35 is sized at one end to slidably support therein an exterior end of tubular anode 28. The exterior portion of gap adjusting screw 34 is adapted with threaded shank 36 at the anode support end, wrenching flats 37 in the middle, and hose attachment fitting 38 at the other end. Rear support assembly 33 also includes threaded support member 39 which supports gap adjusting screw 34 from probe housing 16 by way of screw attachments. A threaded locknut 40 with wrenching flats 41 is provided for locking gap adjusting screw 34 to support member 39 at a predetermined position as noted below.

Axial movement of anode 28 to bring anode tip 29 into contact with sampling surface 13 is caused by an operator pushing start button 42 axially toward the sampling surface. Start button 42 includes shank 43 which is constrained to movement in probe housing slot 44. Set screw 45 has one end anchored in shank 43 and the other end screwed through insulated collar 46 into anode 28 so as to transmit the operator's axial force from starting button 42 into anode 28. A compression type biasing spring 47 surrounding anode 28 applies a biasing force against one side of collar 46 to move the other side of collar 46 against gap adjusting screw 34. This force also acts on anode 28 to move anode tip 29 into an "arc sustaining" position, the position shown in FIG. 2. While in this position, a gap of about 1.2 mm. between anode tip 29 and billet sampling surface 13 should be attained. If such is not the case, the proper gap can be attained by proper adjustment of gap screw 34.

Electrical service between sampling probe 11 and portable flame photometer 12 is provided by flexible multi-conductor cable 48. Conductors 49 and 50 in this cable connect anode 28 at bushing 32, and cathode 24 at brass plate 20, to respective external positive and negative direct current sources. Conductors 51 and 52 connect reset switch 53 in sampling probe 11 to control circuitry in photometer 12. As will be explained below, reset button 54 is pressed before pushing the start button 42.

The sample aerosol 15 generated by electric arc 14 being struck at sampling surface 13 is transported from anode tip 29 through anode 28 and hose fitting 38 to portable flame photometer 12 by way of a flexible rubber hose 55.

Hand-carried portable flame photometer 12 aspirates sample aerosol 15 over hose 55 by means of a built-in induction burner where sample particles are excited to a light-emitting level. Light emitted at two selected portions of a spectra corresponding to iron and manganese are detected, analyzed and displayed on a "Percent Manganese" (% Mn) meter by self-contained electro-optical components. The meter reading is retained until an operator depresses reset button 54 on sampling probe 11, thereby preparing the spectrometric apparatus for the next sample and analysis.

Portable flame photometer 12 includes ventilated housing 56 shown in FIGS. 1 and 4 as having a carrying handle 57, supporting legs 58, and an equipment mounting shelf 59 located midway across housing 56, thereby establishing upper and lower compartments in housing 56. The right end 60 of housing 56 is adapted to be hinged along vertical hinge 61 at the rear of housing 56 to provide access to components in the upper and lower compartments. A flame compartment 62 is established by sub-dividing the right end of the upper compartment with flame barrier 63, and by attaching chimney 64 on top of an opening in the top of right end 60 of said housing. Chimney 64 includes baffles 65 and 66 to prevent direct exposure of personnel to an internal flame, as well as to prevent exterior radiant energy such as ambient light from entering flame compartment 62.

Portable flame photometer 12 also includes induction burner 67 as detailed in FIG. 3. Induction burner 67 is located in the right end 60 of housing 56, midway between the upper and lower compartments, and consists of a modified brass utility burner assembly which includes parts supplied by Bernzomatic Corp. from their model No. JT680C "Maxi-Jet-Torch" burner. Induction burner 67 comprises fuel inlet 68, Bernzomatic Corp. fuel metering orifice 69 having an 0.006 inch dia. opening located in fuel inlet 68, a Bernzomatic Corp. venturi intake system 70 consisting of body 71 having air inlet openings 72 located just above orifice 69, and an axially located venturi 73, a flame attenuator 74 mounted to venturi body 71 and extending above and below the discharge end of body 71, and a flame diffuser screen 75 and screen cap 76 secured to the upper end of flame attenuator 74.

The Bernzomatic Corp. venturi intake system 70 is modified by providing a brass air inlet 77 completely surrounding air intake openings 72. Air inlet 77 includes hose fitting 78 for attaching rubber hose 55 thereto so that substantially all of the combustion-supporting air required for burner 67 is supplied by the atmospheric air in the sample aerosol 15 generated by sampling probe 11. A small air bleed hole 79 is located in the wall of hose fitting 78 to prevent burner flame 80 from being extinguished when anode tip 29 is caused to momentarily contact sampling surface 13 during the striking of electric arc 14. Although not shown on the drawings, air bleed hole 79 may alternatively be located in anode 28 near anode tip 29 for the same purpose.

Flame attenuator 74 is located in a hole in shelf 59 and held there by collar 81 so that the upper portion of induction burner 67 will be located in flame compartment 62. Collar 81 is adjusted vertically so that the blue cones of flame 80 are adjusted to be about one-eighth inch below the lower edge of aperture 82 in the wall of flame barrier 63. An additional collar 81 (not shown) may be located beneath shelf 59 if desired.

Induction burner 67 is fueled preferably from a Bernzomatic Corp. Model No. Tx-9 pressure-bottled propane source 83 removably mounted in the lower compartment of flame photometer housing 56. Bernzomatic Corp. Model No. AT-5621 pressure-regulator/shut-off valve 84 is detachably connected to propane source 83 and preset to regulate the propane pressure to about 26 psi while flowing through braided rubber hose 85 to burner fuel inlet 68. Valve 84 is so adjusted that flowing propane aspirates sample aerosol 15, by way of hose 55 and burner air inlet 77 then mixes with aerosol atmospheric air in venturi intake system 70 to subsequently produce a low-energy flame 80. Flame 80 excites sample particles in aerosol 15 to a level where a spectra of radiant energy 86 is emitted which represents iron, manganese, and other elements, in a continuum having a low background in the manganese region. It is to be noted that propane is a preferred fuel for producing the low-energy flame, as well as the resulting low-background continuum, because this permits a simplified electro-optical arrangement for analyzing spectra 86.

The electro-optical components used to analyze the spectra of radiant energy 86 are shown schematically in FIG. 5 and are physically located in portable flame photometer 12 generally as shown in FIGS. 1 and 4. These components include photomultiplier (PM) tubes 87 and 88 designated "Fe" and "Mn" respectively, and mounted on shelf 59 in light detecting compartment 89, the latter being established by placing light barrier 90 in the left end of the upper compartment of photometer housing 56. Light barrier 90 includes apertures 91 and 92 for imaging spectra 86 on respective photocathodes in the Fe and Mn PM tubes 87 and 88. Light shields 93 and 94, each having an image window, are placed over PM tubes 87 and 88 in alignment with apertures 91 and 92, respectively.

Mounted on the window of light shield 93 is an Fe optical filter 95 designed to permit PM tube 87 to be responsive to light from spectra 86 only in a range from 5,650A to 5,750A. In addition, mounted on the window of light shield 94 is an Mn optical filter 96 designed to permit PM tube 88 to be responsive to light from spectra 86 only in a range from 4,022A to 4,038A. PM tubes 87 and 88 have output signals proportional to the amount of iron and manganese, respectively, in sampling surface 13 of the billet 10 being tested. The actual magnitude of these output signals is governed by the density of optical components, and to PM tube sensitivity to light at various wavelengths. PM tube sensitivity is determined by the amount of high voltage DC applied to each PM tube's string of dynodes.

Additional electronic components are mounted in the lower compartment of photometer housing 56, mainly on printed circuit board 97. Included in such components is low-voltage DC source 98 which is shown only in FIG. 5, said source being a conventional constant-current type having positive and negative output terminals connected to anode 28 and cathode 24 in sampling probe 11 by way of conductors 49 and 50, respectively, said conductors being contained in electric cable 48. Source 98 is designed to maintain a 2.8 ampere current flow from anode 28 through sampling surface 13 to cathode 24, the voltage normally varying from about 35 to about 50 volts DC depending upon the instantaneous sample conductivity between anode 28 and cathode 24. Another DC source (not shown) is provided to power the electronic analyzing circuits described below. In addition, a conventional high-voltage DC source 99, which is shown only in FIG. 5, is adapted to 1,500 a 1500 volt DC source for the dynode strings in PM tubes 87 and 88. It is to be noted that all of the above-noted DC sources may be designed to be powered from either a self-contained battery pack (not shown) locatable in photometer housing 56, or from an external AC source (not shown).

Potentiometers 100 and 101 are provided to adjust the high voltage DC from source 99 to the dynode strings in PM tubes 87 and 88 to between about 600 v. and about 1,100 v. The particular value depends upon the sensitivity required to cause the output signals of PM tubes 87 and 88 to achieve a predetermined ratio when billet 10 contains known amounts of iron as internal standard and manganese as an identifying element.

However, it is to be understood that the output signals from PM tubes 87 and 88 are not actually ratioed during normal operations of the present spectrometric apparatus.

Referring now to FIG. 5, the output signals from PM tubes 87 and 88 will hereinafter be referred to as the Fe signal and the Mn signal, respectively. Both of these signals are fed to control unit 102 which consists simply of a few conventional logic devices, such as relays, arranged to control the program sequence of analysis of the Fe and Mn signals. Control unit 102 directs the Fe signal to an Fe accumulator 103 and the Mn signal to an Mn accumulator 104, both signals being grounded initially for a short time delay as noted below. In both accumulators 103 and 104, the respective Fe and Mn signal charges an input capacitor and the accumulated charge is amplified by an operational amplifier therein.

The amplifier in Fe accumulator 103 has an output signal which is fed to comparator 105 where it is compared to a reference signal from adjustable reference voltage source 106, said reference voltage representing a predetermined percent concentration of iron to be had in a test piece. Simultaneously, the amplifier in Mn accumulator 104 has an output signal which is fed through control unit 102 and scaling potentiometer 107 to % Mn meter 108, thereby providing an indication of the accumulated concentration of manganese in steel billet 10. Prior to analyzing billet 10, potentiometer 107 is adjusted to calibrate % Mn meter 108 over a range of about 0.1 percent at a point slightly above zero to 2.0 percent at full scale with known metal standards.

Current flow for electric arc 14 is sensed in low voltage DC source 98 and a current flow control signal is fed to time delay device 109 to signify that electric arc 14 is generating sample aerosol 15. After a predetermined time period, which corresponds to the time needed to cleanse hose 55 and transport sample aerosol 15 to be aspirated from sampling probe 11 to induction burner 67, time delay device 109 causes control unit 102 to remove the ground from the Fe and Mn signals as noted above and permit the capacitors in Fe and Mn accumlators 103 and 104 to begin charging. When the accumulated Fe signal exceeds the reference signal from source 106, then comparator 105 signals control unit 102 to interrupt capacitor charging in accumulators 103 and 104, to interrupt the current flow from low-voltage source 98 to sampling probe 11 so as to terminate electric arc 14, and to hold the % Mn meter 108 reading to indicate the percent concentration of manganese in steel billet 10.

The percent manganese concentration reading will be retained on meter 108 until the operator presses button 54 on reset switch 53. This causes control unit 102 to discharge the capacitors in Fe and Mn accumulators 103 and 104, to restore meter 108 to its low point, to simultaneously ground the Fe and Mn signals from PM tubes 87 and 88, and restore the spectrometric apparatus to an initial condition prior to the operator pressing start button 42 to begin another sampling test.

We claim:

1. In spectrometric apparatus for identifying a conductive test piece by analyzing a sample aerosol having sample particles with known elemental characteristics, the improvement consisting essentially of a sampling probe comprising:
   a. a cylindrical probe housing made of electrically insulating material and provided with an atmospheric air opening at one end thereof,
   b. a cathode mounted at the open end of said probe housing, said cathode including an axial air space and further including an end surface adapted to contact a sampling surface of said test piece, and
   a. a hollow anode located in said probe housing and adapted to cooperate with said cathode to strike a low-voltage electric arc in atmospheric air on said sampling surface, thereby generating a sample aerosol consisting of atmospheric air and arc-disrupted sample particles, said aerosol withdrawn through said hollow anode for subsequent analysis.

2. The apparatus of claim 1 wherein said probe housing includes means associated with identifying the test piece.

3. The apparatus of claim 1 wherein said cathode is a magnet which enables the sampling probe to be detachably mounted to test pieces with magnetic properties.

4. The apparatus of claim 1 wherein said cathode includes an air passageway disposed laterally across the said end contact surface.

5. The apparatus of claim 1 wherein said anode is adapted to be moved in said probe housing to momentarily contact said sampling surface.

6. The apparatus of claim 5 wherein said anode is further adapted to be biased and subsequently withdrawn from the sampling surface to an arc-sustaining position.

7. The apparatus of claim 1 wherein said anode further includes a heat sink affixed thereto in the region of the open air space in said housing.

8. The apparatus of claim 1 including:
   d. means including conductors for connecting said anode and cathode to a source of electric current and a hose for conducting said sample aerosol away from said sampling probe.

9. Spectrometric apparatus for identifying a conductive test piece, comprising:
   a. a hand-held sampling probe comprising:
      .1 a cylindrical probe housing made of electrically insulating material and provided with an atmospheric air opening at one end thereof,
      .2 a cathode mounted at the open end of said probe housing, said cathode including an axial air space and further including an end surface adapted to contact a sampling surface of said test piece, and
      .3 a hollow anode located in said probe housing and adapted to cooperate with said cathode to strike an electric arc in atmospheric air on said sample surface, thereby generating a sample aerosol consisting of atmospheric air and arc-disrupted sample particles having known elemental characteristics, said aerosol withdrawn through said hollow anode for subsequent analysis, and
      .4 means including electrical conductors for connecting said anode and cathode to an external source of electric current, and further including a hose for conducting said sample aerosol away from the hollow anode in said sampling probe, and
   b. flame photometer means connected to means 9.a.4 and adapted to provide said electric arcing current to said sampling probe, and further adapted to aspirate said sample aerosol by means of a self-contained induction burner, said photometer means including photoelectric means for analyzing the burner flame to determine the concentration of a plurality of known elements in said sample particles, and further including means for indicating the concentration of at least one said element to identify said test piece.

10. In spectrometric apparatus for identifying test material by generating a sample aerosol having sample particles with known elemental characteristics and then analyzing said particles, the improvement consisting essentially of flame photometer means comprising:
   a. a housing having an upright chimney,
   b. a pressurized bottle of gaseous fuel in said housing,
   c. an induction burner located in said chimney and adapted to aspirate said sample aerosol from its source while burning said fuel, said burner adjusted to excite sample particles in a flame and emit a spectra of radiant energy representing a plurality of known elements in said sample particles,
   d. photoelectric means for analyzing said spectra during a single test to produce separate element signals corresponding to the accumulated concentration of an internal standard element and at least one identifying element,
   e. control means receiving said separate element signals and acting on said photoelectric analyzing means to interrupt the concentration accumulation of each said identifying element whenever said internal standard element concentration accumulates to a predetermined value, and
   f. means for utilizing at least one interrupted identifying element signal to identify said test material without directly comparing the internal standard signal with an identifying element signal.

11. The apparatus of claim 10 wherein said control means includes time delay means acting on the photoelectric analyzing means for delaying the analysis of flame spectra for a period corresponding to the time required to transport said sample aerosol from its source to said induction burner.

12. The apparatus of claim 10 wherein said test material is steel and said photoelectric analyzing means is adapted to accumulate the concentration of iron as said internal standard element.

13. The apparatus of claim 10 wherein said test material is steel and said photoelectric analyzing means is adapted to accumulate the concentrations of iron and manganese as said internal standard element and one of said identifying elements respectively.

14. Portable spectrometric apparatus for on-site identification of a conductive test piece, comprising:
   a. sampling probe means including an anode and cathode adapted to strike an electric arc on a sampling surface of said test piece and generate a sample aerosol having arc-disrupted sample particles with known elemental characteristics, and
   b. portable flame photometer means comprising:
      .1 a hand-carried housing having an upright chimney,
      .2 a source of arcing current connected to the anode and cathode in said sampling probe means,
      .3 a pressurized bottle of gaseous fuel in said housing,
      .4 an induction burner located in said chimney and adapted to aspirate said sample aerosol from the sampling probe means while burning said fuel, said burner adjusted to excite sample particles in a flame and emit a spectra of radiant energy representing a plurality of known elements in said sample particles,
      .5 photoelectric means for analyzing said spectra during a single test to produce separate element signals corresponding to the accumulated concentration of an internal standard element and at least one identifying element, .6 control means receiving said separate element signals and acting on said photoelectric analyzing means to interrupt the concentration accumulation of each said identifying element whenever said internal standard element concentration accumulates to a predetermined value, and .7 means for utilizing at least one interrupted identifying element signal to identify said test material without directly comparing the internal standard signal with an identifying element signal.

15. Portable spectrometric apparatus for on-site identification of a conductive test piece, comprising:

a. hand-held sampling probe means comprising:

.1 a cylindrical probe housing made of electrically insulating material and provided with an atmospheric air opening at one end thereof, .2 a cathode mounted at the open end of said probe housing, said cathode including an axial air space and further including an end surface adapted to contact a sampling surface of said test piece, and .3 a hollow anode located in said probe housing and adapted to cooperate with said cathode to strike an electric arc in atmospheric air on said sample surface, thereby generating a sample aerosol consisting of atmospheric air and are-disrupted sample particles having known elemental characteristics, said aerosol withdrawn through said hollow anode for subsequent analysis, and .4 means including electrical conductors for connecting said anode and cathode to an external source of electric current, and further including a hose for conducting said sample aerosol away from the hollow anode in said sampling probe, and b. portable flame photometer means comprising:

.1 a hand-carried housing having an upright chimney,

.2 a source of arcing current connected to the anode and cathode in said sampling probe means, .3 a pressurized bottle of gaseous fuel in said housing, .4 an induction burner located in said chimney and including a fuel inlet connected to said fuel source, and an air inlet connected to the hollow anode in said sampling probe, said burner adapted to aspirate the sample aerosol and obtain substantially all of the combustion supporting gas for burning said fuel from atmospheric air in said aerosol, said burner adjusted to excite sample particles in a flame and emit a spectra of radiant energy representing a plurality of known elements in said sample particles, .5 photoelectric means for analyzing said spectra during a single test to produce separate element signals corresponding to the accumulated concentration of an internal standard element and at least one identifying element, .6 control means receiving said separate element signals and acting on said photoelectric analyzing means to interrupt the concentration accumulation of each said identifying element whenever said internal standard element concentration accumulates to a predetermined value, and .7 means for utilizing at least one interrupted identifying element signal to identify said test material without directly comparing the internal standard signal with an identifying element signal.

* * * * *